Nov. 21, 1967 L. A. PROHOFSKY ETAL 3,354,445

MATED-FILM ELEMENT WITH SINGLE VERTICAL WORD LINE

Filed Jan. 3, 1966 2 Sheets-Sheet 1

INVENTORS
LEROY A. PROHOFSKY
ROBERT J. BERGMAN
BY Thomas J. Nikolai
ATTORNEY

INVENTORS
LEROY A. PROHOFSKY
ROBERT J. BERGMAN
BY Thomas J. Nikolai
ATTORNEY

United States Patent Office 3,354,445
Patented Nov. 21, 1967

3,354,445
MATED-FILM ELEMENT WITH SINGLE VERTICAL WORD LINE
Leroy A. Prohofsky, Minneapolis, Minn. (Univac Park, St. Paul, Minn. 55116), and Robert J. Bergman, Univac Park, St. Paul, Minn. 55116
Filed Jan. 3, 1966, Ser. No. 518,372
12 Claims. (Cl. 340—174)

ABSTRACT OF THE DISCLOSURE

A magnetizable memory element that includes two thin-ferromagnetic-film layers that are formed about an aperture in a substrate member for forming a first closed flux path thereabout to drive fields generated by an energized first drive line passing through said aperture. The two layers have superposed first portions that form memory areas each of which first portions envelops a second drive line and which first portions have sides overlapping the enveloped drive line. The overlapping sides form closely-coupled portions on both sides of said enveloped drive line creating a substantially-closed second flux path about the enveloped drive line wherein said first and second flux paths are substantially orthogonal to each other in said memory area.

The present invention is an improvement in the Mated-Film memory element disclosed in copending patent application of K. H. Mulholland, Serial No. 498,743, filed October 20, 1965, assigned to the Sperry Rand Corporation as is the present invention. The copending Mulholland application discloses a Mated-Film element that includes two thin-ferromagnetic-film layers that are formed in a stacked, superposed relationship about a suitable drive line and whose overlapping sides formed closely-coupled portions creating a substantially-closed flux path about the enveloped drive line. The enveloped drive line is typically a common bit and sense line used to sense the element's output during the readout operation and to carry bit current during the write operation. The axis of anisotropy, or easy axis, is in the circumferential direction about the enveloped drive line, i.e., orthogonal to the longitudinal axis of the enveloped drive line, whereby the energized enveloped drive line provides a longitudinal drive field $H_l$ in a circumferential direction about the enveloped drive line in the area of the Mated-Film element causing the flux in the two layers in the Mated-Film element to become aligned in an antiparallel relationship. A second drive line, preferably a printed circuit member, running over and returning under the Mated-Film element is oriented with its longitudinal axis parallel to the easy axis of the Mated-Film element whereby the enveloping drive line when energized by an appropriate current signal produces a transverse drive field $H_t$ in the area of the Mated-Film element. The resulting product constitutes a memory cell that possesses all the desirable characteristics of a planar, thin-ferromagnetic-film memory element while being substantially unaffected by the creep phenomenon.

The copending patent application of R. J. Bergman et al., Serial No. 504,543, filed October 24, 1965, discloses an improvement in the copending patent application of Mulholland wherein the enveloping word line of the Mulholland application is replaced by a word line that envelops the Mated-Film element but is oriented in the area of the Mated-Film element with its longitudinal axis orthogonal to the plane of and to the easy axis of the Mated-Film element whereby the enveloping word line, when energized by appropriate current signals, produces a transverse drive field $H_t$ in the area of the Mated-Film element. Additionally, there is provided a planar layer of high permeability material that is stacked above and that is parallel to the plane of the Mated-Film element for providing a low-reluctance, substantially-closed flux path for the transverse drive fluid $H_t$ provided by the energized word line. The high permeability layer has an aperture between the enveloping word line in the area of the Mated-Film element whereby the flux provided by the energized word line passes through the high permeability layer but due to the aperture in the high permeability layer in the area of the Mated-Film element such flux is caused to pass through the layers of the Mated-Film element in a direction transverse to the easy axis thereof.

The present invention is a further improvement of such copending applications in that there is provided herein a Mated-Film memory element wherein the thin-ferromagnetic-film layers that form the Mated-Film element also provide the closed flux path for the energized word line drive fields thus eliminating the high permeability layer of the R. J. Bergman et al. application. The elimination of this additional high permeability layer provides whereby a Mated-Film element that may be formed by any one of various well known fabrication techniques.

The thin-ferromagnetic-film layers of the preferred embodiment have single domain properties although such is not required by the present invention. The term "single domain property" may be considered the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high, i.e., approaches the flux density at magnetic saturation.

As disclosed in the above discussed copending patent application of K. H. Mulholland the memory area of the Mated-Film element is limited to those portions of the magnetizable layers that envelop the enveloped sense line and whose remanent magnetization is substantially parallel to the magnetic axis of the sense line. As in the preferred embodiment of the present invention the magnetizable layers are thin-ferromagnetic-films having single domain properties it is desirable that such layers have the property of uniaxial anisotropy for providing an easy axis along which the layers' remanent magnetization shall reside. The so induced anisotropic constant $H_k$ provides an increased switching speed of the memory area magnetization when such magnetization is subjected to a conjoint longitudinal drive field $H_l$ and a transverse drive field $H_t$. This provides an increased output signal intensity. Further, as the output signal intensity is a cosine function of the parallel relationship of the memory area's remanent magnetization and the sense line's magnetic axis such remanent magnetization and sense line's magnetic axis should preferably be everywhere parallel. The present invention is directed toward an improved Mated-Film element wherein the magnetizable layers thereof form memory areas along a larger proportional length of the magnetizable layers than previously disclosed; the longer memory areas provide a correspondingly greater output signal intensity in the coupled sense line upon readout.

Accordingly, it is a primary object of the present invention to provide a novel memory element and the method of fabrication thereof.

These and other more detailed and specific objectives will be disclosed in the following specification, reference being had to the accompanying drawings in which.

Figure 1:
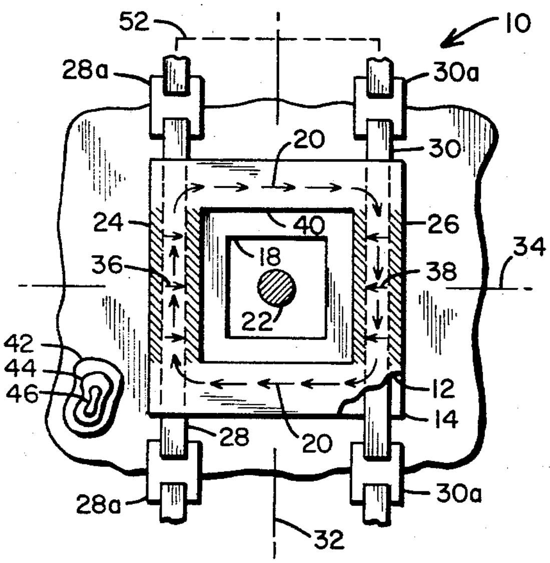
FIG. 1 is an illustration of a plan view of a first embodiment of the present invention.

With particular reference to FIG. 1 there is presented an illustration of a plan view of a first embodiment of a Mated-Film element of the present invention. As discussed hereinabove, and in more detail in the above discussed copending patent application of K. H. Mulholland, the Mated-Film element achieves its unique output characteristic, as compared to coupled-film elements, due to the sandwiched arrangement of the thin-ferromagnetic-film layers and the enveloped drive line. Element 10 is comprised of at least thin-ferromagnetic-film layers 12 and 14 that are formed upon substrate 16 having a central aperture 18 therethrough and about which layers 12 and 14 are oriented. Layers 12 and 14 together form a closed flux path for transverse word drive fields $H_t$ identified by arrows 20 generated by an energized word drive line 22. Each of the layers 12 and 14 have superposed portions that form memory areas 24, 26 which superposed portions envelop bit drive lines 28 and 30, respectively, and which superposed portions have sides (the shaded portions) overlapping the enveloped drive lines 24 and 26. Layers 12 and 14 are symmetrically oriented about aperture 18 in substrate 16 about major axis 32 and about minor axis 34.

Drive lines 28 and 30 are symmetrically oriented along the opposing leg portions of layers 12 and 14 and are sandwiched between superposed portions of layers 12 and 14 in the areas of memory areas 24 and 26, respectively. The two superposed portions of layers 12 and 14 that overlap the enveloped drive lines 28 and 30 form at their overlapping sides closely-coupled mated-film portions that create a substantially-closed flux path about the enveloped drive line for longitudinal drive fields $H_l$ of a first or second and opposite polarity as developed by energized intercoupled drive lines 28 and 30. Such longitudinal drive fields $H_l$ are identified by arrows 36 and 38 of a first or second and opposite polarity flowing in a circumferential direction orthogonal to the longitudinal axis of drive lines 36 and 38, which first or second and opposite directions are representative of a stored "1" or "0" in memory areas 24 and 26 of element 10. Additionally, layers 12 and 14 are preferably formed possessing the characteristic of unaxial anisotropy having a sufficiently high anisotropic constant $H_k$ with their anisotropic axes, or easy axes, oriented parallel to axis 34; with their hard axes oriented orthogonal to axis 34 or parallel to axis 32. Such superposed portions of layers 12 and 14 that overlap the enveloped bit lines 28 and 30 are identified by shaded areas lying between the horizontal portions of superposed layers 12 and 14.

Element 10 may be formed by any one of the plurality of well-known methods of fabrication of magnetizable memory elements; for discussion of some such methods see the copending patent applications of W. W. Davis, Ser. No. 254,913, filed Jan. 30, 1963, now Pat. No. 3,276,000, and P. E. Oberg et al., Ser. No. 332,220, filed Dec. 20, 1963, both assigned to the same assignee as is the present invention. Due to the continuous nature of layers 12 and 14 such layers do not lend themselves to a continuous deposition process—see the copending patent application of R. P. Halverson, Ser. No. 503,364, filed Oct. 23, 1965, for such an embodiment. However, layers 12 and 14 may be vapor deposited upon substrate 16 by use of a suitable mask having an outline of layers 12 and 14 and centered about aperture 18 in substrate 16. Layers 12 and 14 may after the deposition process be suitably etched to define the internal contour 40 and to remove the vapor deposited magnetization material from the walls of aperture 18; particularly in the areas of memory areas 24 and 26 where a more-than-necessary build-up of magnetizable material may deleteriously affect the memory operation of element 10.

Element 10 may be formed in the preferred embodiment in the following steps:

(A) The base element of element 10 is planar glass substrate 16 of 0.006 inch thickness that has an aperture 18 therethrough; aperture 18 provides the opening through which word line 22 may pass perpendicularly through the plane of substrate 16. Axes 32, 34 are here utilized only to define the major and minor axes, respectively, of element 10 for purposes of orienting the elements and magnetic axes thereof.

(B) Upon substrate 16 and above aperture 18 is formed thin-ferromagnetic-film layer 14 of 4,000 Angstroms (A) in thickness and of approximately 80% Ni—20% Fe and having an anisotropic axis aligned with axis 34 providing an easy axis thereby.

(C) Next, an insulating layer 42 may be laid down upon the assembly of layer 12 and substrate 16. If a vapor deposition process is utilized layer 42 may consist of a silicon monoxide (SiO) layer of 5,000 (A) in thickness that is deposited on the assembly of layer 14 and substrate 16. Additionally, insulating layer 42 may consist of a Mylar (polyethylene terephthalate) sheet of 0.005 inch in thickness affixed to the assembly of layer 14 and substrate 16 by a suitable adhesive.

(D) Next, upon layer 42 and centrally oriented along memory areas 24 and 26 are laid down copper drive lines 28 and 30 that may be of approximately of 4,000 A. in thickness. If element 10 is to be formed in a continuous deposition process it may be necessary, due to the limiting characteristic of the drive line 28 and 30 defining mask, to lay down two copper interconnecting strips **28*a* and 30*a* of approximately 4,000 A. in thickness to provide electrical continuity between the plurality of corresponding lines 28 and 30 in a plurality of elements 10**.

(E) Next, an insulating layer 44 similar to layer 42 of Step C may be laid down upon the assemblage.

(F) Next, upon layer 44 and superposed layer 14, is laid down layer 12 which is substantially similar to layer 14 of Step B above.

(G) Lastly, an insulating layer 46, which may be similar to layers 42 and 44 of Steps C and E above, is laid down over the entire stacked assembly for the sealing thereof.

It has been found by the applicants that the insulating layers 42 and 44 of SiO normally provide poor electrical insulating characteristics between the magnetizable layers and the copper bit line in the area of areas 24 and 26 when element 10 is fabricated in a continuous deposition process. Due to the changing environmental conditions (temperature, pressure, etc.), within the evacuatable enclosure during the deposition process and to the irregular surfaces of the metallic layers, the layers of SiO may develop pinhole or crack-like apertures therethrough through which the currents flowing through the bit line may short through to the metallic layers. Consequently, to ensure desirable operation thereof when element 10 is fabricated in a continuous deposition process, each element 10 is electrically insulated from each other by no two elements 10 having common magnetizable material whereby there is precluded the possibility of the shorting of parallel adjoining lines 28, **28*a*, 30 and 30*a***. Further, as word line 22 may be an uninsulated copper wire it is desirable that no magnetizable material be permitted to form on or to be deposited along the walls of aperture 18 in substrate 16 so as to permit the shorting of word line 22 through the magnetizable layers 12, 14. As the embodiments of FIGS. 1, 5, and 8 include two separate common bit and sense lines, it is important that in these embodiments the insulating layers that insulate the common bit and sense lines from the magnetizable layers be of a sufficient electrical dielectric quality to preclude the shorting of the electrical signals thereby.

As stated above the layers SiO provided by the continuous deposition process provide poor electrical insulating characteristics. However, the layers of SiO are essential in the continuous deposition process to prevent diffusion of the layers of magnetizable material and copper; particularly in the area of memory areas 24, 26. With the magnetic characteristic of memory areas 24 and 26 being critical to the proper operation of element 10 it is essential that the diffusion between such metals be prevented. Accordingly, although such layers of SiO are not relied upon to provide electrical insulating characteristics therebetween, such layers are utilized to preclude contamination of the magnetizable layers during the continuous deposition process when such process is utilized for the fabrication of element 10.

It is desirable that no magnetizable material be permitted to form upon the walls of aperture 18 of substrate 16 for reasons other than to preclude the possibility of the shorting of word line 22 to a bit line 28, 30. As disclosed in the aforementioned K. H. Mulholland application areas 24 and 26 are the memory or active area of element 10 in which the binary information is written and from which the binary information is read. As the magnetizable material in the mated-film areas defined by the shaded areas of FIGURE 1 play no or little part in providing an output signal to lines 28 and 30 but do provide an area of high permeability, i.e., low reluctance, to the transverse drive field $H_t$ represented by arrows 20 of FIG. 1, it is desirable that the amount of magnetizable material in the shaded areas be kept to a minimum such that the transverse drive field $H_t$ provided by the energized word drive line 22 be concentrated in the area of memory areas 24 and 26 contiguous to bit lines 28 and 30, respectively. Accordingly, it is desirable that no magnetizable material be formed in the areas of aperture 18 in substrate 16 along memory areas 24 and 26 and that the amount of magnetizable material in the mated-film areas defined by the shaded areas of FIGURE 1 be kept to a minimum consistent with requirements of producibility and operability of element 10.

Figure 2:
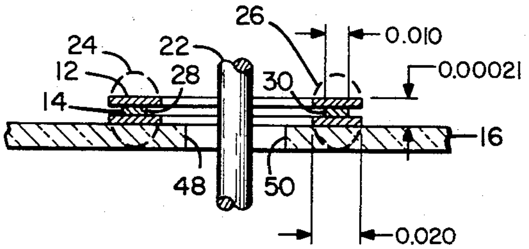
FIG. 2 is a diagrammatic illustration of a cross section of the element of FIG. 1 taken along axis 34.

With particular reference to FIG. 2 there is presented a diagrammatic illustration of a cross section of element 10 taken along axis 34 of FIGURE 1 with the passive members such as insulating layers 42, 44 and 46 omitted for the sake of clarity. FIG. 2 points out the approximate dimensions of the memory areas 24 and 26 of element 10 of the illustrated embodiment as indicating a width-to-thickness ratio of approximately 100. Further, there is illustrated the vertically oriented word line 22 whose longitudinal axis is orthogonal to the planes of layers 12 and 14, and which passes centrally through aperture 18 of substrate 16. Lastly, there is identified the portions 48 and 50 of aperture 18 that are in the vicinities of Mated-Film memory areas 24 and 26, respectively, in which it is particularly desirable that no excess magnetizable material be permitted to be deposited or formed.

The memory plane assembly formed by the sandwiched construction of substrate 16 through layer 46 (not including word line 22) is an integral package and may be formed by any one of the plurality of well-known techniques. In the illustrated embodiment each of the magnetizable layers 12 and 14 are formed with an anisotropic axis parallel to axis 34 whereby a current signal coupled to intercoupled drive lines 28 and 30 (intercoupled by a schematically illustrated conductive strip 52) establish longitudinal drive fields $H_l$, particularly in layers 12 and 14 in memory areas 24, 26 in the circumferential directions about bit lines 28 and 30, respectively, of a first or second and opposite direction representative of a stored "1" or "0" as a function of the polarity of the current signal applied thereto. With the proper current signal coupled to word line 22 where is established in areas 24 and 26 a transverse drive field $H_t$ that tends to align the magnetization M of layers 12 and 14 in the areas of areas 24 and 26 into substantial alignment along the hard axis of areas 24 and 26, i.e., that lies along a line parallel to axis 32.

With reference again to FIG. 1 there is illustrated a plan view of element 10 that illustrates the general configuration of the path of the magnetic flux generated by current signals flowing through word line 22 and intercoupled bit lines 28 and 30. When a suitable current signal is coupled to word line 22 there is established about such word line a magnetic field represented by arrows 20 flowing in the circumferential direction thereabout. This circumferential field about line 22 seeks a path of low reluctance, and, accordingly, concentrates in the paths presented by layers 12 and 14. Further, with a suitable current signal coupled to intercoupled bit lines 28 and 30 (by a conductive strip 52) there is established in the area of areas 24 and 26 magnetic fields represented by arrows 36 and 38, respectively, flowing in circumferential directions about the corresponding bit lines 28 and 30 of a first or second and opposite direction representative of a stored "1" or "0" as a function of the polarity of the current signal applied thereto. This magnetic flux in the area of memory areas 24 and 26 is a longitudinal drive field $H_l$ oriented parallel to the easy axes of areas 24 and 26 that is aligned with axis 34 and tends to cause the magnetization M of areas 24 and 26 to become aligned with axis 34. With the magnetic fields schematically illustrated by arrow 20, 36 and 38 established by suitable current signals flowing through word line 22 and bit lines 28 and 30 in the areas of memory areas 24 and 26, there are provided magnetic fields orthogonal to each other in the areas of areas 24 and 26 that are vectorially additive such that by the proper selection of the relative field intensities the magnetization M of areas 24 and 26 may be established into any one of a plurality of previously determined magnetic states in a rotational mode disclosed in the S. M. Rubens et al. Patent No. 3,030,612.

Figure 3:
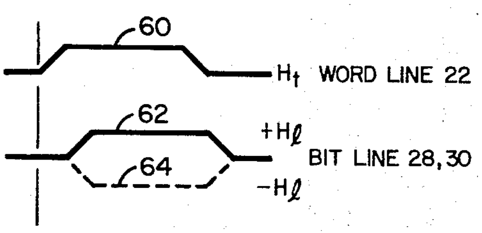
FIG. 3 is an illustration of the signal waveforms associated with the writing operation of the element of FIG. 1.

With particular respect to FIG. 3 there are illustrated the waveforms of the current signals utilized to accomplish the writing operation of element 10. In this arrangement, transverse drive field 60 is initially applied to element 10 by a current signal flowing through word line 22 causing the magnetization M of areas 24 and 26 to rotate out of alignment with the anisotropic axes along axis 34. Next, longitudinal drive field 62 for a writing of a "1" or a longitudinal drive field 64 for the writing of a "0" is applied to areas 24 and 26 by suitable polarity current signals coupled to intercoupled bit lines 28 and 30 which longitudinal drive fields $H_l$ steer the magnetization of areas 24 and 26 into the particular polarization along anisotropic axis 34 that is associated with the respective polarity of waveforms 64, 62.

Figure 4:
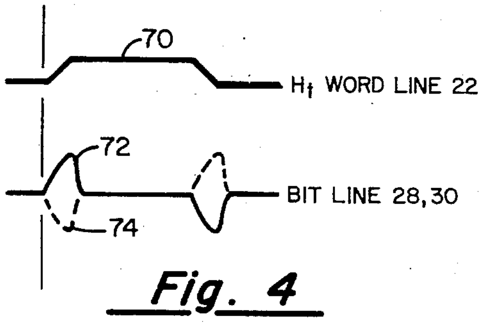
FIG. 4 is an illustration of the signal waveforms associated with the reading operation of the element of FIG. 1.

With particular respect to FIG. 4 there are illustrated the signal waveforms associated with the reading operation of element 10. The readout operation is accomplished by the coupling of the appropriate current signal to word line 22 thus generating in the area of areas 24 and 26 a transverse drive field $H_t$ that is below the reversible limit of the magnetization of memory areas 24 and 26 and that only rotates the magnetization of areas 24 and 26 out of alignment with their anisotropic axis 34 inducing in intercoupled common bit-sense lines 28 and 30 output signal 72 or 74 indicative of a stored "1" or "0," respectively in areas 24 and 26. As illustrated here the polarity phase of the output signal during the readout operation is indicative of the information state of the memory element 10 concerned.

Figure 5:
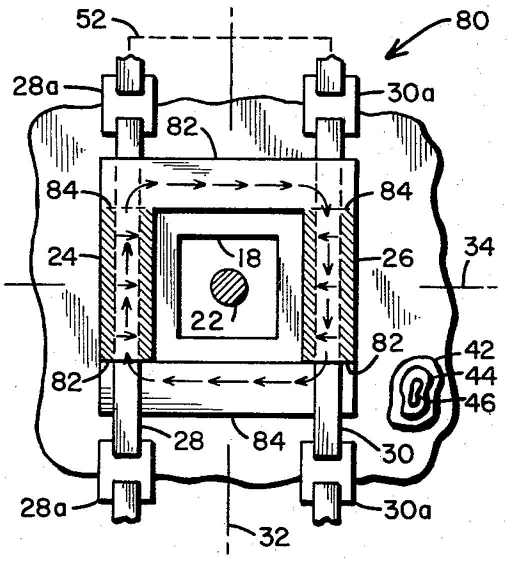
FIG. 5 is an illustration of a plan view of a second embodiment of the present invention.

With particular reference to FIG. 5 there is presented an illustration of a plan view of a second embodiment of a Mated-Film element of the present invention. Element 80 particularly lends itself to the fabrication thereof by the continuous deposition process in that closed-flux-path layers 12 and 14 of FIG. 1 have herein been replaced by open-flux-path layers 82 and 84, respectively, which are generally C shaped, and are oriented about aperture 18 in substrate 16 and which, in their superposed relationship, close the otherwise open-flux-path of the other.

Figures 6, 7, 8, 9:
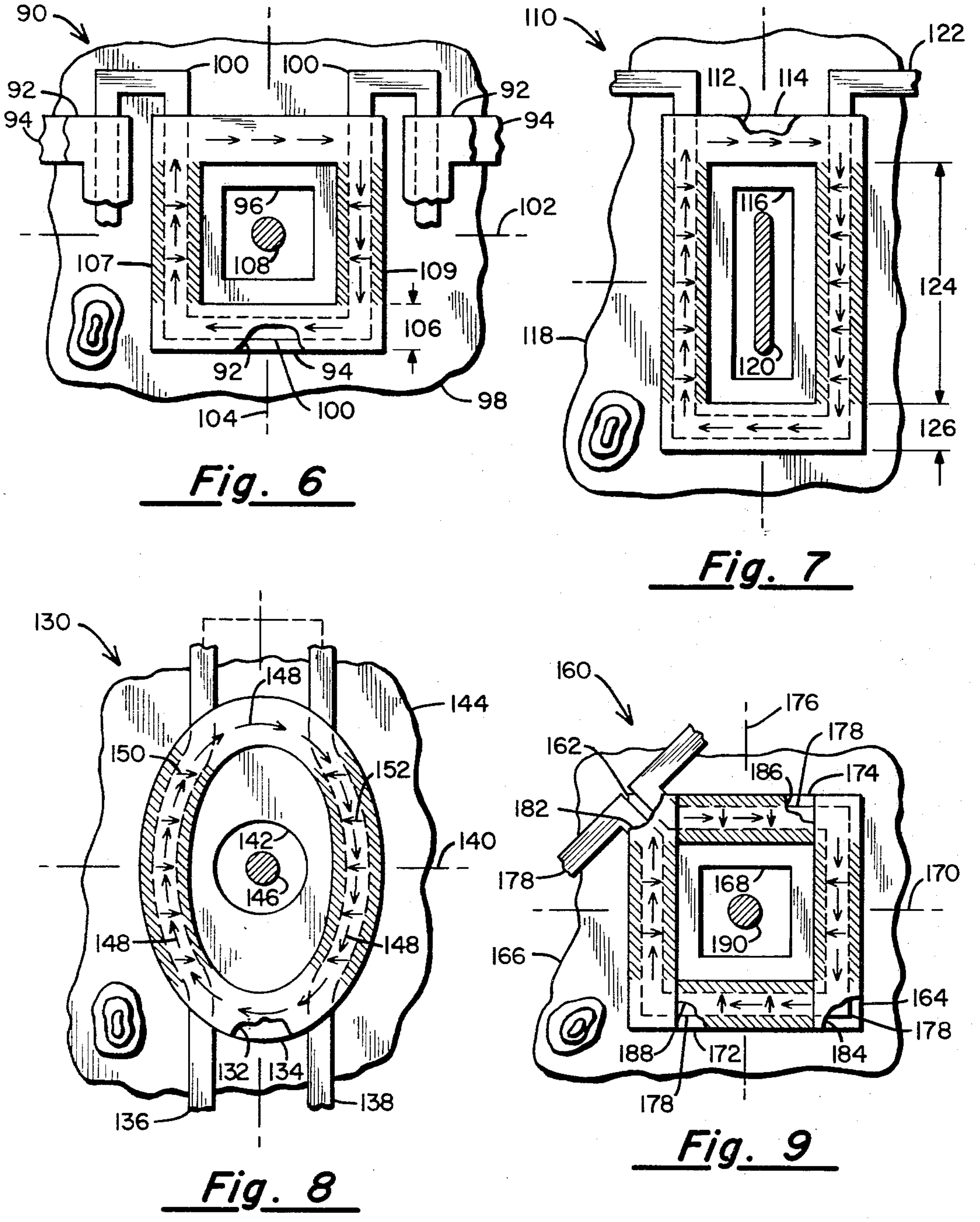
FIG. 6 is an illustration of a plan view of a third embodiment of the present invention.
FIG. 7 is an illustration of a plan view of a fourth embodiment of the present invention.
FIG. 8 is an illustration of a plan view of a fifth embodiment of the present invention.
FIG. 9 is an illustration of a plan view of a sixth embodiment of the present invention.

With particular reference to FIG. 6 there is presented an illustration of a plan view of a third embodiment of a Mated-Film element of the present invention. In this arrangement element 90 is substantially similar to element 10 of FIG. 1 in that layers 92 and 94 are oriented in a superposed relationship about aperture 96 in substrate 98 sandwiching a continuous common bit-sense line 100 therebetween. Drive line 100 may be serially intercoupled to a plurality of elements 90 oriented along axis 102 with each element 90 oriented symmetrically about a corresponding axis 104. With layers 92 and 94 formed with their easy axes aligned along axis 102 the areas of layers 92 and 94 within the area 106 contribute little or no signal to the superposed sandwiched drive line 100 upon readout by the coupling of a properly polarized current signal to word line 108. As the magnetic field established by the readout signal flowing through word line 108 is a longitudinal drive field in such area 106 while a transverse drive field in memory areas 107 and 109 it is apparent that an improved readout signal intensity can be achieved by increasing the length of the areas, i.e., the memory areas, that contribute to the readout signal that is induced in the common bit-sense line 100 while the non-readout contributing areas such as area 106 may be substantially reduced in size without affecting the intensity of the readout signal.

With particular reference to FIG. 7 there is presented an illustration of a plan view of a fourth embodiment of a Mated-Film element of the present invention. Element 110 is an example of one manner in which the above described, with respect to FIG. 6, increasing of the effective length of the memory areas may be accomplished. In this arrangement layers 112 and 114 are oriented in a superposed relationship about elongated aperture 116 in substrate 118 through which ribbon-like word line 120 passes in a substantially perpendicular orientation with respect to the plane of substrate 118. In a manner similar to the hereinabove described embodiments common bit-sense line 122 is sandwiched between layers 112 and 114 forming the memory areas generally lying in the areas designated 124. As can be readily seen here the non-output signal contributing area 126 of the superposed portions of layers 112 and 114 and the sandwiched portion of common bit-sense line 122 lying generally in the area designated 126 is of a substantially smaller proportional length of the magnetic flux path provided by layers 112 and 114 as compared with the active or memory areas lying along the greater proportional length of the magnetic layers 112 and 114 lying generally in the areas 124.

With particular reference to FIG. 8 there is presented an illustration of a plan view of a fifth embodiment of a Mated-Film element of the present invention. This embodiment achieves the desired larger proportional length of the active or memory area between the mated-film areas identified by the shaded areas with respect to the shorter non-output contributing areas therebetween. This arrangement is similar to the hereinabove discussed relationships with element 130 formed by the superposed layers 132 and through 134 sandwiching the intercoupled common bit-sense lines 136 and 138 therebetween forming the active or memory areas between the Mated-Film areas designated by the shaded areas. In this arrangement layers 132 and 134 are formed with their easy axes aligned parallel axis 140 with the longitudinal axis of the intercoupled drive lines 136 and 138 substantially parallel the layer defining outlines in the shaded areas. With layers 132 and 134 supposed about aperture 142 in substrate 144 a circumferential field generated by a current signal flowing through word line 146 establishes a magnetic field in layers 132 and 134 generally designated by arrows 148. With the magnetization M of layers 132 and 134 generally aligned along axis 140 in a first or second direction as designated by arrows 150 or 152 it can be seen that the desired orthogonal relationship of the remanent magnetization of the active memory areas to the transverse drive field designated by arrows 148 is not achieved except along axis 140. Accordingly, although a larger proportional length of the active memory area is achieved by this arrangement the desired optimum relationship of the applied transverse drive field $H_t$ during the read operation with the previously established remanent magnetization of element 130 generally aligned with axis 140 produces a less desirable output signal intensity for a given read signal application to word line 146 than is achieved in the embodiment of FIG. 7.

With particular reference to FIG. 9 there is presented an illustration of a plan view of a sixth embodiment of a Mated-Film element of the present invention. In all previously discussed embodiments of the present invention the magnetizable layers forming the memory element have their magnetic axes all parallel to one axis; such as axis 34 of FIG. 1. In the embodiment of FIG. 9 it is proposed that the memory element 160 be comprised of a plurality of discrete layers of magnetizable material whereby the layers of magnetizable layers are formed with their easy axes parallel to the easy axes of the common bit-sense line in the areas of the so-formed memory areas. In the proposed embodiment of element 160 as is illustrated in FIG. 9, layers 162 and 164 are formed upon substrate 166 about aperture 168 therethrough in a generally parallel arrangement with their easy axes parallel to axis 170. Next, layers 172 and 174 are formed on substrate 166 along opposing sides of aperture 168 with their easy axes parallel axis 176 closing the otherwise open-flux-path presented by layers 162 and 164. Next, common bit-sense line 178 is laid down upon and generally centrally oriented within the outlines of layers 162, 164, 172 and 174. Next layers 182 and 184 are generated upon layers 162 and 164, respectively, sandwiching common bit-sense line 178 therebetween forming the memory areas designated by the associated shaded sections. As with the formation of layers 162 and 164, layers 182 and 184 are formed with their easy axes parallel to axis 170. Next layers 186 and 188 are established in a superposed relationship upon layers 174 and 172, respectively, sandwiching their respective portions of common bit-sense line 178 therebetween establishing the memory areas designated by the shaded areas associated therewith. As with the formation of the bottom layers formed by layers 162, 164, 174 and 172, layers 182, 184, 186 and 188 form a closed-flux-path for a magnetic field established by a current signal flowing through word line 190. In this embodiment whereby the easy axes of the different legs forming the different first and second layers sandwiching the common bit-sense line therebetween have their easy axes substantially everywhere oriented parallel to the magnetic axis of the enveloped common bit-sense line there is provided a maximum effective length of memory areas coupling the common bit-sense line which for dimensions comparable to the embodiment of FIG. 1 provides effectively twice the effective length of memory areas as does the embodiment of FIG. 1.

Thus, it is apparent that there has been described and illustrated therein a preferred embodiment of the present invention that provides a novel memory and a method of fabrication thereof that provide an improved volumetric efficiency requiring decreased drive current intensities over prior art arrangements. It is understood that suitable modifications may be made in the structure as disclosed provided that such modifications come within the spirit and scope of the appended claims. Having now fully illustrated and described our invention, what we claim to be new and desire to protect by Letters Patent is set forth in the appended claims.

We claim:

1. A magnetizable memory element, comprising:
an electrically-insulating planar substrate member;
said substrate member having an aperture therethrough;
superposed first and second planar-closed-flux-path layers each of a magnetizable material;
said first and second film layers each associated with said aperture for forming a planar-closed-flux-path thereabout;
a conductive strip having portions sandwiched between said superposed layers;
said superposed first and second layers forming memory portions in each of which said layers sandwich and envelop an associated portion of said conductive strip between said layers with said layers in said memory portion having sides overlapping said enveloped portions of said conductive strip for forming about said enveloped conductive strip portion a substantially-closed flux path that is orthogonal the longitudinal axis of said associated conductive strip portion;
each of said memory portions and the associated enveloped conductive strip forming a memory area; and
binary information stored in said memory areas in a first or second and opposite circumferential flux direction about said enveloped conductive strips.

2. The memory element of claim 1 further including: first and second insulating layers for insulating said layers from said conductive strip.

3. The memory element of claim 2 wherein said first and second insulating layers are diffusion-preventing layers for preventing the diffusion of the magnetizable material of the film layers and the copper of the conductive strips during the fabrication thereof by a vapor deposition process.

4. The memory element of claim 1 wherein each of said layers are thin-ferromagnetic-film layers having single domain properties and possess the property of uniaxial anisotropy for providing in the plane of said film layer an easy axis along which the film layer's remanent magnetization shall reside in a first or second and opposite direction, and wherein said longitudinal axis of each of said associated conductive strip portions is orthogonal said film layers' easy axes in said memory areas.

5. A magnetizable memory element, comprising:
an electrically-insulating planar substrate member;
said substrate member having an aperture therethrough;
superposed first and second planar-closed-flux-path layers each of a magnetizable material;
said first and second layers each associated with said aperture for forming a planar-closed-flux-path thereabout;
two conductive strips each having portions sandwiched between said superposed layers;
said superposed first and second layers forming two memory portions wherein said layers sandwich and envelop an associated one of said conductive strips between said layers with said layers in said memory portions having sides overlapping said enveloped conductive strips for forming about each of said enveloped conductive strips a substantially-closed flux path that is orthogonal the longitudinal axis of said associated conductive strip;
each of said memory portions and the associated enveloped conductive strip forming a memory area; and,
binary information stored in said memory areas in a first or second and opposite circumferential flux direction about said enveloped conductive strips.

6. The memory element of claim 5 further including: first and second insulating layers for insulating said layers from said conductive strips.

7. The memory element of claim 6 wherein said first and second insulating layers are diffusion-preventing layers for preventing the diffusion of the magnetizable material of the film layers and the copper of the conductive strips during the fabrication thereof by a vapor deposition process.

8. The memory element of claim 5 wherein each of said layers are thin-ferromagnetic-film layers having single domain properties and possess the property of uniaxial anisotropy for providing in the plane of said film layer an easy axis along which the film layer's remanent magnetization shall reside in a first or second and opposite direction, and wherein said longitudinal axis of each of said associated conductive strips is orthogonal said film layers' easy axes in said memory areas.

9. A magnetizable memory element, comprising:
an electrically-insulating planar substrate member;
said substrate member having an aperture therethrough;
superposed first and second planar-open-flux path layers each of a magnetizable material;
said first and second layers each associated with said aperture;
two conductive strips each having portions sandwiched between said superposed layers;
each of said first and second layers having portions for closing the otherwise open flux path of the other of said layers around said aperture;
said superposed first and second layers forming two memory portions wherein said layers sandwich and envelop an associated one of said conductive strips between said layers with said layers in said memory portions having sides overlapping said enveloped conductive strips for forming about each of said enveloped conductive strips a substantially-closed flux path that is orthogonal the longitudinal axis of said associated conductive strip;
each of said memory portions and the associated enveloped conductive strip forming a memory area; and,
binary information stored in said memory areas in a first or second and opposite circumferential flux direction about said enveloped conductive strips.

10. The memory element of claim 9 further including: first and second insulating layers for insulating said layers from said conductive strips.

11. The memory element of claim 10 wherein said first and second insulating layers are diffusion-preventing layers for preventing the diffusion of the magnetizable material of the film layers and the copper of the conductive strips during the fabrication thereof by a vapor deposition process.

12. The memory element of claim 9 wherein each of said layers are thin-ferromagnetic-film layers having single domain properties and possess the property of uniaxial anisotropy for providing in the plane of said film layer an easy axis along which the film layer's remanent magnetization shall reside in a first or second and opposite direction, and wherein said longitudinal axis of each of said associated conductive strips is orthogonal said film layers' easy axes in said memory areas.

References Cited

UNITED STATES PATENTS 3,305,845 2/1967 Grace et al. -------- 340—174

OTHER REFERENCES

IBM Technical Disclosure Bulletin, "Memory Using Planar Magnetic Film Cores," by Middelhoek, vol. 6, No. 12, May 1964, pages 66 and 67.

BERNARD KONICK, *Primary Examiner.*

S. M. URYNOWICZ, *Assistant Examiner.*